United States Patent
Navabi

(10) Patent No.: US 10,914,910 B2
(45) Date of Patent: Feb. 9, 2021

(54) SIGHT GLASS

(71) Applicant: L.J. STAR INCORPORATED, Twinsburg, OH (US)

(72) Inventor: Aarash Navabi, Walpole, MA (US)

(73) Assignee: L.J. Star Incorporated, Twinsburg, OH (US)

( * ) Notice: Subject to any disclaimer, the term of this patent is extended or adjusted under 35 U.S.C. 154(b) by 69 days.

(21) Appl. No.: 15/744,633

(22) PCT Filed: Feb. 22, 2017

(86) PCT No.: PCT/US2017/018880
§ 371 (c)(1),
(2) Date: Jan. 12, 2018

(87) PCT Pub. No.: WO2017/147154
PCT Pub. Date: Aug. 31, 2017

(65) Prior Publication Data
US 2018/0203201 A1    Jul. 19, 2018

Related U.S. Application Data

(60) Provisional application No. 62/298,172, filed on Feb. 22, 2016.

(51) Int. Cl.
| | |
|---|---|
| *G02B 7/00* | (2006.01) |
| *B01J 3/00* | (2006.01) |
| *F23M 11/04* | (2006.01) |
| *G01F 23/02* | (2006.01) |
| *G02B 1/04* | (2006.01) |
| *G02B 5/20* | (2006.01) |

(52) U.S. Cl.
CPC ............. *G02B 7/007* (2013.01); *B01J 3/004* (2013.01); *F23M 11/042* (2013.01); *G01F 23/02* (2013.01); *G02B 1/04* (2013.01); *G02B 5/208* (2013.01)

(58) Field of Classification Search
CPC ......... G02B 7/007; G02B 5/208; G01F 23/02; B01J 3/004; F23M 11/042
USPC ........... 359/827–830, 894; 116/276; 220/663
See application file for complete search history.

(56) References Cited

U.S. PATENT DOCUMENTS

| 3,277,713 A | 10/1966 | Demyon | |
|---|---|---|---|
| 3,373,610 A * | 3/1968 | Ortwin Stieber | ....... G01F 23/02 73/334 |
| 3,977,251 A | 8/1976 | Meginnis | |
| 4,162,826 A * | 7/1979 | Van der Beck | ........ G02B 7/007 351/154 |
| 4,807,474 A * | 2/1989 | Foster | ..................... B01J 3/004 116/276 |
| 5,125,269 A * | 6/1992 | Horst, Jr. | ................. G01F 23/02 116/276 |
| 5,127,433 A | 7/1992 | Argyle | |
| 5,243,929 A | 9/1993 | Brown | |
| 5,974,877 A * | 11/1999 | Burgess, Jr. | .......... B23P 11/025 116/227 |

(Continued)

FOREIGN PATENT DOCUMENTS

DE            4041816 A1     6/1992

*Primary Examiner* — Nicholas R. Pasko
(74) *Attorney, Agent, or Firm* — Edwin A. Sisson, Attorney at Law, LLC; Jeffrey J. Banyas

(57) ABSTRACT

A sight glass for observation of industrial applications using a non-glass lens.

23 Claims, 4 Drawing Sheets

(56) References Cited

U.S. PATENT DOCUMENTS

| | | | | |
|---|---|---|---|---|
| 6,212,989 B1* | 4/2001 | Beyer | ............... | F41H 5/263 |
| | | | | 102/201 |
| 6,404,560 B1* | 6/2002 | Hori | ............... | G02B 3/14 |
| | | | | 359/665 |
| 6,499,439 B1* | 12/2002 | Kohler | ............... | F23M 11/042 |
| | | | | 122/19.2 |
| 6,567,224 B2* | 5/2003 | Hatakeyama | ............... | G02B 7/02 |
| | | | | 359/819 |
| 6,639,745 B1* | 10/2003 | Cheng | ............... | G02B 7/007 |
| | | | | 220/663 |
| 6,938,481 B2* | 9/2005 | Paterek | ............... | C03C 27/042 |
| | | | | 73/323 |
| 8,049,978 B1* | 11/2011 | Su | ............... | G02B 7/02 |
| | | | | 359/819 |
| 2002/0189554 A1 | 12/2002 | Kohler et al. | | |
| 2004/0187522 A1* | 9/2004 | Kikuchi | ............... | C03B 11/08 |
| | | | | 65/39 |
| 2010/0053786 A1* | 3/2010 | Schachinger | ............... | G02B 7/007 |
| | | | | 359/894 |

* cited by examiner

SIGHT GLASS

This application claims priority from International Patent Application No. PCT/US2017/018880 filed on 22 Feb. 2017 and U.S. Provisional Application No. 62/298,172 filed on 22 Feb. 2016, the teachings of each of which are incorporated by reference herein in their entirety.

BACKGROUND

The sight glass has its origins with steam processes and has been used on boilers and engines to observe water levels. Early sight glasses mostly consisted of simple glass tubes attached to a boiler.

Modern day sight glasses, also known as sight windows, have found a place in process observation applications such as the pharmaceutical, food, beverage, and bio-gas industries, for example. Contemporary versions of sight glasses may be categorized as glass disc sight glasses or fused glass sight glasses. Glass disc sight glasses have glass discs that are held between metal frames and are secured with bolts and gaskets to create a seal. Fused glass sight glasses have glass that is fused or hermetically sealed to a metal frame and the seal does not necessarily require the use of bolts or gaskets. Fused sight glass processing often mechanically pre-stresses the glass by compressing it, and thereby increasing its strength.

Sight glasses used in modern applications utilize various glass types. Soda lime and borosilicate are the two most common types used. Soda lime is the least expensive of the two and it provides optical clarity. Borosilicate, on the other hand, also tolerates high temperatures and is resistant to chemical corrosion and thermal shock, while maintaining its optical clarity. In addition, borosilicate has a lower coefficient of thermal expansion than many other glasses. Therefore it is able to withstand more significant pre-stressing, thereby increasing its strength more significantly.

In the food industry, sight glasses with glass lenses are not always acceptable because glass can chip without complete failure and therefore can go unnoticed in applicable processes. One non-limiting application of a polymer sight glass window is in the manufacture of foods such as jams, granola bars, and other foods. There is a zero tolerance for glass in these applications, since glass chips can never be found in the final product. Therefore, there is a need for a safe, strong, and optically clear alternative to glass disc and fused glass sight glasses used in industry. Polymer windows will not chip and therefore are best for use in food manufacturing plants and other applications requiring the use of these devices.

SUMMARY

All examples and features mentioned below can be combined in any technically possible way.

A sight glass meant for use in process observation in various industrial applications may have an optically clear polymer instead of glass. The optically clear polymer may be placed within a rigid frame, allowing a user to safely and clearly view processes of interest without disrupting the processes. The polymers used in the sight glass may withstand significant processing pressures which may be maximized through optimal geometric design of a lens frame in which it is installed. In one example, the geometry of the sight glass may be such that the polymer of the sight glass is the only material to come into contact with the process being viewed through the sight glass.

The present disclosure includes a device that is similar to a fused glass-style sight glass that uses non-glass windows or optically clear polymers instead of glass. The internal geometry of the sight glass allows a polymer to withstand high pressures, while maintaining its integrity. The polymer can be selected to meet a wide variety of application requirements. Also, a frame mating surface may be generally conical, providing a surface to which a window mating surface mates with the frame mating surface, securing the window against the frame when pressure is applied against the window surface. The window may also have a bulbous, square, rectangular or otherwise shaped region that mates within a frame groove in the frame mating surface. Further, the frame could be constructed and arranged such that a part of it is exposed to an internal volume of a vessel to which the subject sight glass is mounted. In yet another embodiment, the frame could be made of non-metallic materials such as plastics that have sufficient mechanical properties, such as PEEK (Polyether ether ketone), for example.

In one aspect, a sight glass window may be made from a polymer, or another non-glass material. In some non-limiting examples the window is optically clear. In other examples the window can act as a light filter, allowing infrared light to pass while blocking visible light, for example. Or the window may be made of a colored material in accordance with the preferences of the users. The window clarity and its light filtration properties may be chosen to meet the particular requirements of the process being viewed or the preferences of the users, depending upon the process and what the viewing is expected to accomplished through the window.

DETAILED DESCRIPTION

Figure 1:
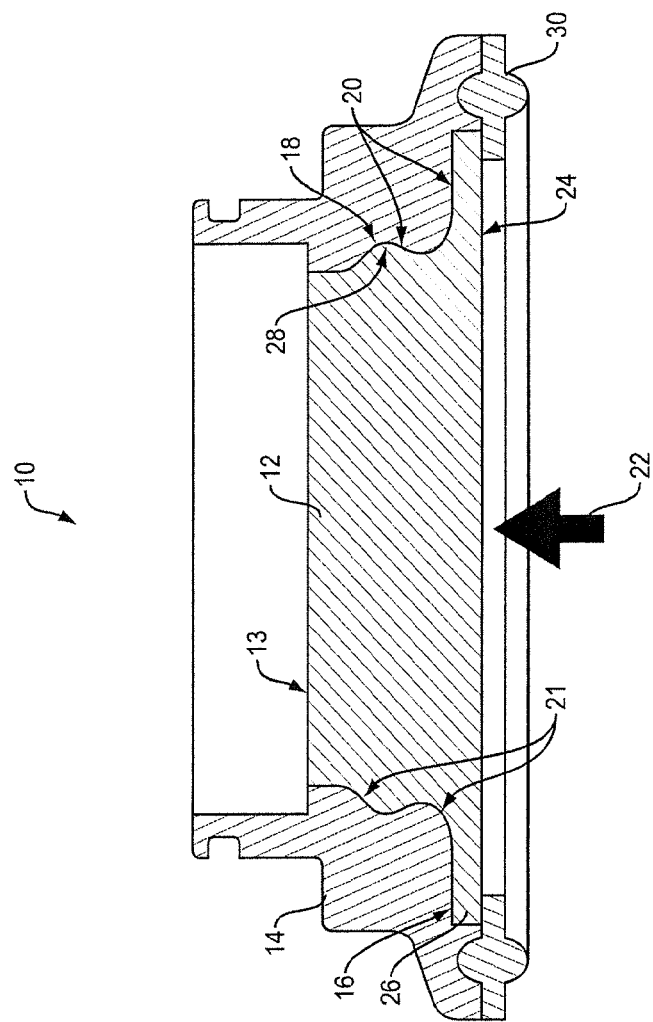
FIG. 1 is a cross-sectional view of a sight glass with a non-glass window.

Embodiments of the present invention relate to the use of polymer or other non-glass material, and unique geometry within a fused glass style sight glass. FIG. 1 shows sight glass 10 having an optically clear window 12 placed inside of metal frame 14, with frame slot 16 and frame groove 18 cut or formed into frame mating surface 20 which mirrors window mating surface 21. First surface 24 opposes second surface 13 of window 12. By using a polymer or another non-glass material instead of glass as window 12 of sight glass 10, the window material can be chosen to suit specific application requirements, such as being able to withstand higher temperatures or pressures or to be FDA food safe. For the food industry, one non-limiting embodiment of sight glass 10 is for use in the manufacture of foods such as jam, granola bars, and other foods. Non-chipping polymer window 12 allows sight glass 10 to be used where glass windows are not acceptable.

Frame mating surface 20 and window mating surface 21 secure window 12 within frame 14, allowing the window to withstand high pressures applied from a potential process or processes being observed through sight glass 10. Pressure 22 is applied against first surface 24 of window 12 which, in turn, presses against frame mating surface 20 and window mating surface 21 of sight glass 10. Window rim 26 overlaps frame slot 16 so that window 12 is pushed securely against frame 14 around the periphery of window 12. Similarly, in this embodiment, window 12 features a bulbous shaped region 28 which mirrors frame groove 18 helping to secure window 12 within frame 14, maximizing the pressure resistance of sight glass 10. Gasket 30 secures a portion of first surface 24 of window 12 to help maintain a secured and sealed position within frame 14.

Figure 2:
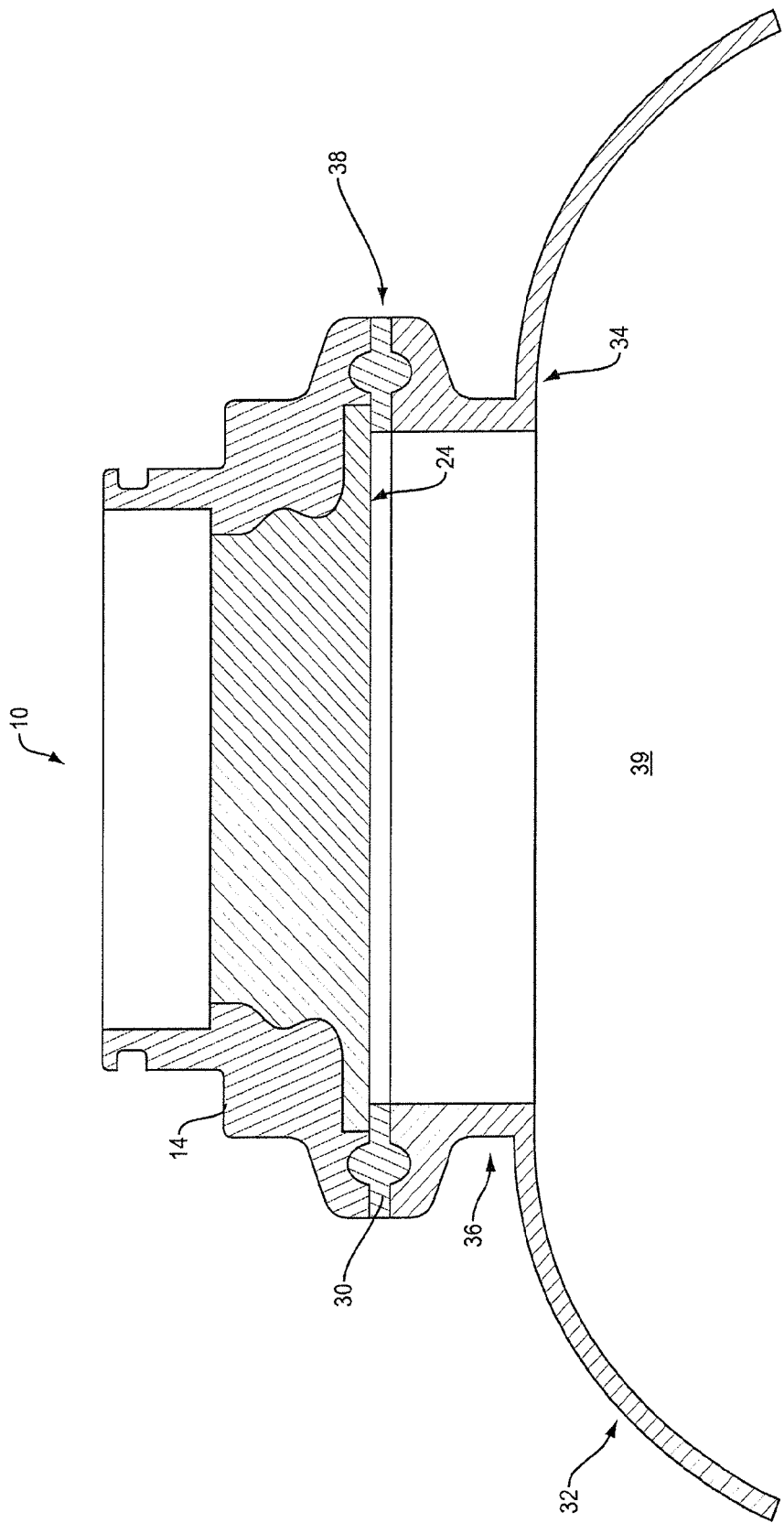
FIG. 2 is a cross-sectional view of an interface between a sight glass mounted to a process vessel.

A non-limiting application for sight glass 10 is depicted in FIG. 2. Vessel 32 with interior surface 34 has a ferrule 36 that is constructed to mate with frame 14 and its gasket 30 to form sanitary connection 38, although a sanitary fitting is not shown for the sake of clarity. Window first surface 24 is the only part of sight glass 10 that is exposed to any processes occurring within vessel internal volume 39.

Figure 3:
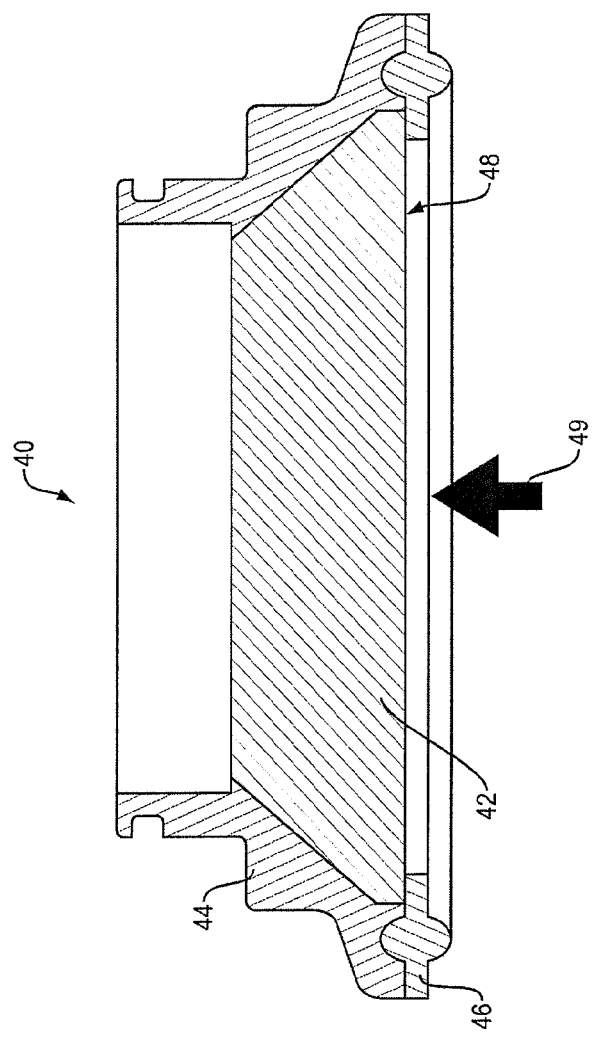
FIG. 3 is a cross-sectional view of a sight glass with a non-glass, generally conically-shaped window within a likewise shaped frame.

The particular internal geometry/shape of frame 14 in FIG. 1 is not necessary. The frame could take other shapes. FIG. 3 shows sight glass 40 with generally conically-shaped window 42 and frame 44 constructed and arranged to fit window 42. In this embodiment gasket 46 is shown overlapping first surface 48 of window 42, although gasket 46 may not be necessary. Pressure 49 is applied from the process being observed against window first surface 48, further pressing window 42 against frame 44.

Figure 4:
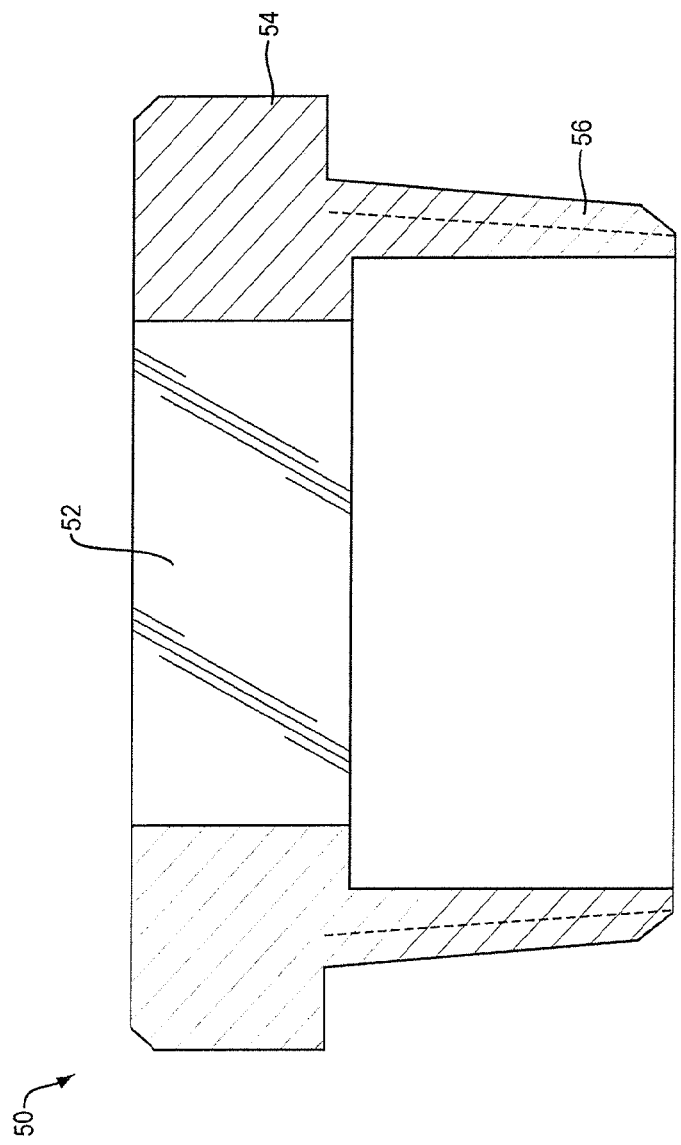
FIG. 4 is a cross-sectional view of an alternate embodiment of a sight glass with a non-glass window.

The subject sight glass can be used in applications other than those that require a sanitary clamp-style fitting, as a frame and window can be applied without limitation of the fitting type. For example, FIG. 4 shows sight glass 50 having frame 54 with threaded plug-like extension 56. This embodiment shows sight glass 50 with window 52 mounted in frame 54, and threaded extension 56 that is sized and shaped to interface with a threaded port of some process vessel or the like. Extension 56 may or may not be intrinsic to the frame 54.

A number of implementations have been described. Nevertheless, it will be understood that additional modifications may be made without departing from the scope of the inventive concepts described herein, and, accordingly, other embodiments are within the scope of the following claims.

What is claimed is:
1. A sight glass comprising:
 a window with a first surface, a window mating surface, and a second surface opposing the first surface;
 a frame of one-piece construction with a frame mating surface; and
 a gasket;
wherein the window is a non-glass material;
wherein a top surface of the gasket contacts a bottom surface of the frame and also contacts the first surface of the window;
wherein the window allows light to be transmitted through it; and
wherein the window mating surface mates to the frame mating surface, and mating of the window mating surface to the frame mating surface is independently capable of preventing the window from falling out of the frame.
2. The sight glass of claim 1 wherein the window is a polymer.
3. The sight glass of claim 1 further comprising:
 a frame groove; and
 a window shaped region;
wherein the frame groove is cut or formed in the frame mating surface; and
wherein the window shaped region is constructed and arranged to mate with the frame groove.
4. The sight glass of claim 1 further comprising:
 a frame slot; and
 a window rim;
wherein the frame slot is cut or formed in the frame mating surface; and
wherein the window rim is constructed and arranged to mate with the frame slot.
5. The sight glass of claim 1 wherein the window covers the frame.
6. The sight glass of claim 1 wherein the window is made with a material that filters a light frequency selected from the group consisting of visible light and infrared light.
7. The sight glass of claim 1 wherein the window is made of a colored material.
8. The sight glass of claim 1 wherein the frame mating surface is conical and the window mating surface is constructed and arranged to mate with the frame mating surface.
9. The sight glass of claim 1 wherein the frame is made from a non-metallic material.
10. The sight glass of claim 1 further comprising a threaded extension constructed and arranged for attachment to a mating threaded port to a vessel in which a process may occur, wherein the threaded extension is intrinsic to the frame.
11. The sight glass of claim 1 further comprising a threaded extension constructed and arranged for attachment to a mating threaded port to a vessel in which a process may occur, wherein the threaded extension is extrinsic to the frame.
12. A sight glass comprising:
 a frame with a frame mating surface;
 a window with a first surface, a window mating surface; a second surface opposing the first surface and a shaped region that mates within a frame groove in the frame mating surface; and
 a gasket;
wherein the window is a non-glass material;
wherein a top surface of the gasket contacts a bottom surface of the frame and also contacts the first surface of the window;
wherein the window allows light to be transmitted through it; and
wherein the window mating surface mates to the frame mating surface, and mating of the window mating surface to the frame mating surface is independently capable of preventing the window from falling out of the frame.
13. The sight glass of claim 12 wherein the window is a polymer.
14. The sight glass of claim 12 further comprising:
 a frame slot; and
 a window rim;
wherein the frame slot is cut or formed in the frame mating surface; and wherein the window rim is constructed and arranged to mate with the frame slot.
15. The sight glass of claim 12 wherein the window covers the frame.
16. The sight glass of claim 12 wherein the window is made with a material that filters a light frequency selected from the group consisting of visible light and infrared light.
17. The sight glass of claim 12 wherein the window is made of colored material.
18. The sight glass of claim 12 wherein the frame mating surface is conical and the window mating surface is constructed and arranged to mate with the frame mating surface.

19. The sight glass of claim 12 wherein the frame is made from a non-metallic material.

20. The sight glass of claim 12 further comprising a threaded extension constructed and arranged for attachment to a mating threaded port to a vessel in which a process may occur, wherein the threaded extension is intrinsic to the frame.

21. The sight glass of claim 12 further comprising a threaded extension constructed and arranged for attachment to a mating threaded port to a vessel in which a process may occur, wherein the threaded extension is extrinsic to the frame.

22. A sight glass comprising:
  a window comprising:
    a first surface;
    a window mating surface;
    a second surface opposing the first surface;
    a rim; and
    a window shaped region; and
  a frame of one-piece construction comprising:
    a frame mating surface;
    a frame slot;
    a frame groove; and
    a gasket;
wherein the window is a non-glass material;
wherein the window mating surface mates to the frame mating surface, and mating the window mating surface to the frame mating surface is independently capable of preventing the window from falling out of the frame;
wherein the window allows light to be transmitted through it;
wherein the frame slot and frame groove are cut or formed in the frame mating surface;
wherein the window shaped region is constructed and arranged to mate with the frame groove;
wherein a top surface of the gasket contacts a bottom surface of the frame and also contacts the first surface of the window; and
wherein the window rim is constructed and arranged to mate with the frame slot.

23. A sight glass comprising:
  a frame comprising:
    a frame mating surface,
    a frame slot,
    a frame groove in the frame mating surface and a gasket;
  a window comprising:
    a first surface,
    a window mating surface,
    a second surface opposing the first surface
    a rim, and
    a shaped region that mates within the frame groove in the frame mating surface;
wherein the window is a non-glass material;
wherein the window mating surface mates to the frame mating surface, and mating of the window mating surface to the frame mating surface is independently capable of preventing the window from falling out of the frame;
wherein the window allows light to be transmitted through it;
wherein the frame slot and frame groove are cut or formed in the frame mating surface wherein the window shaped region is constructed and arranged to mate with the frame groove;
wherein the window rim is constructed and arranged to mate with the frame slot; and
wherein the gasket secures a portion of the first surface of the window to help maintain a sealed configuration.

* * * * *